Sept. 6, 1960     J. J. CARPENTER     2,951,587
OIL FILTER DEVICE

Filed May 28, 1957                                  2 Sheets-Sheet 1

INVENTOR
Jesse J. Carpenter

BY

ATTORNEY

Sept. 6, 1960  J. J. CARPENTER  2,951,587
OIL FILTER DEVICE
Filed May 28, 1957  2 Sheets-Sheet 2

INVENTOR
Jesse J. Carpenter

BY

ATTORNEY

United States Patent Office 2,951,587
Patented Sept. 6, 1960

2,951,587
OIL FILTER DEVICE
Jesse J. Carpenter, 2129 Moneda St., Fort Worth, Tex.
Filed May 28, 1957, Ser. No. 662,038
2 Claims. (Cl. 210—441)

This invention relates to oil filters especially designed for use in circulating lubricating systems for internal combustion engines, and it has particular reference to oil filtering and cleansing devices capable of being installed in motor vehicles, or the like, whose lubricating systems are provided with suitable pumps circulating the oil to vital points, and the principal object of the invention resides in the provision of a filtering device capable of being installed in the system and adapted to remove all foreign particles, such as metal cuttings, sand, grit, and all other injurious matter, including water, which accumulates through condensation in the lubricating oil, thus providing for longer life of the oil and the moving parts of the motor.

Another object of the invention resides in the provision of a simplified filtering device which is capable of being installed in any standard make of vehicle, and which includes a novel filter element, which is expendable and which may be readily replaced by the owner or operator of the vehicle as desired without the aid of a skilled mechanic.

A further object of the invention is to provide a simple and economical structure comprising an oil filter which may be adjusted to accommodate any conventional type of filter cartridge without altering the casing or parts of the circulating system, and thus increase the efficiency of the system in which it is connected.

A still further object of the invention resides in the provision of an oil filtering device which is constructed with cooling fins serving to maintain the lubricating oil at minimum operating temperatures, reducing the heat usually gathered thereby in the normal use of the vehicle, thus reducing the temperature of the lubricated mechanism and providing for greater efficiency in operation.

The invention will be readily understood by referring to the following description and the accompanying drawing, in which.

Figure 1:
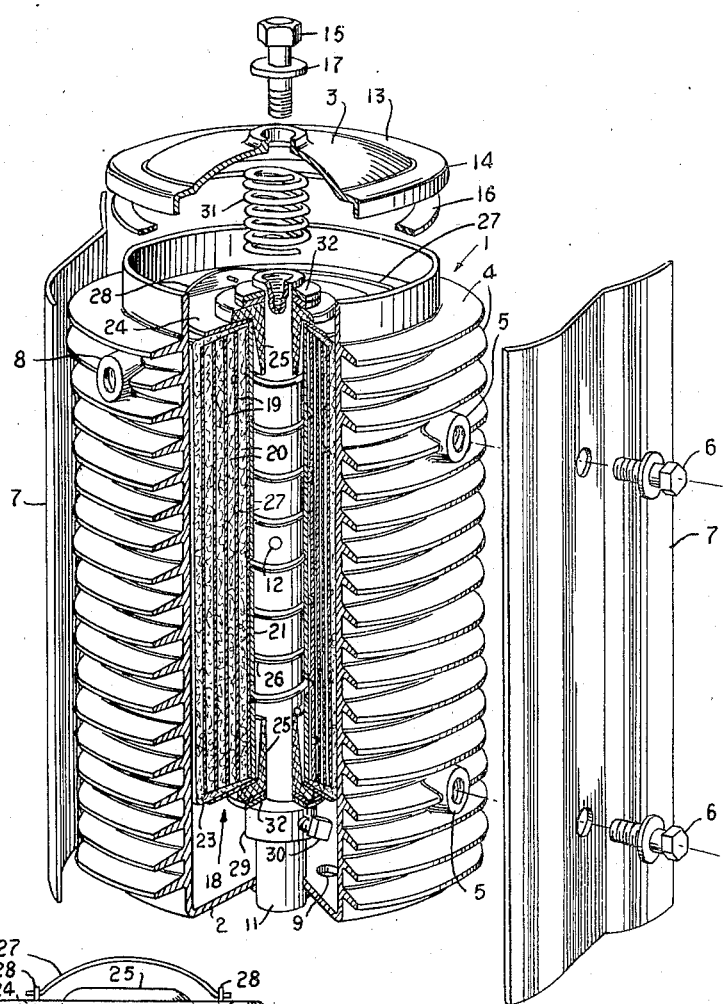
Figure 1 is an exploded perspective view, partly broken away, of an oil filter embodying the invention.
Figure 2:
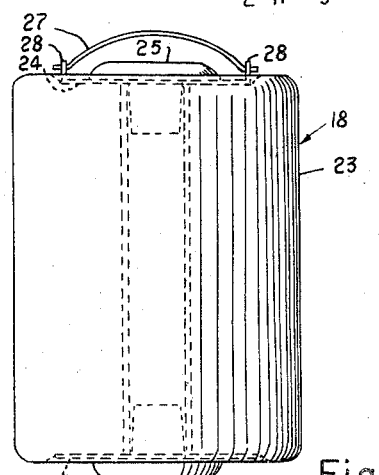
Figure 2 is a side elevational view of an interchangeable filter element which is incorporated therein.
Figure 3:
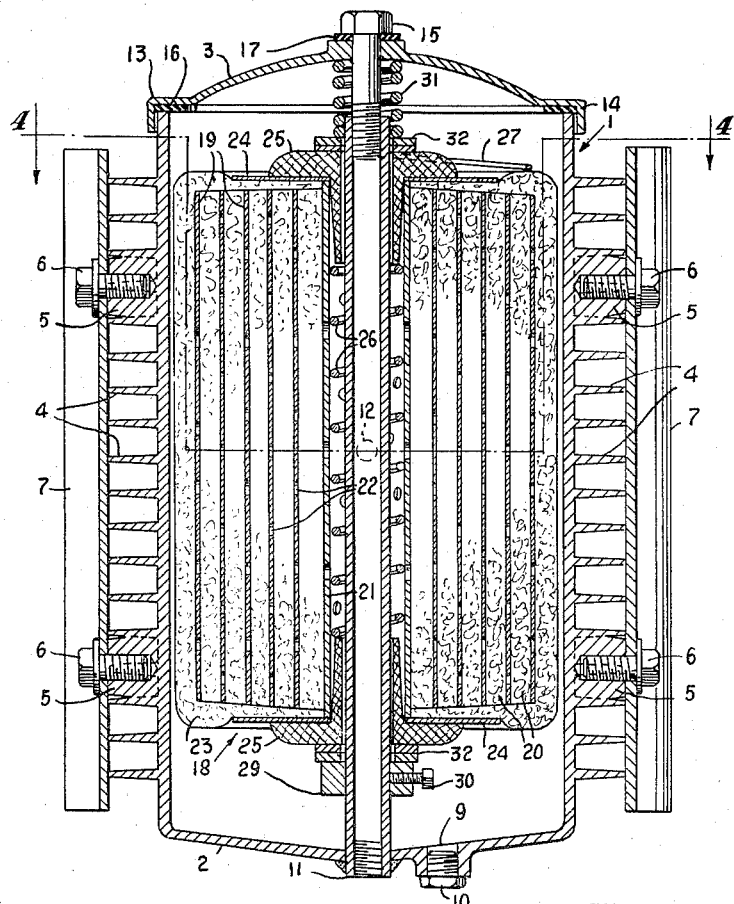
Figure 3 is a sectional elevational view taken on the lines 3—3 of Figure 4.
Figure 4:
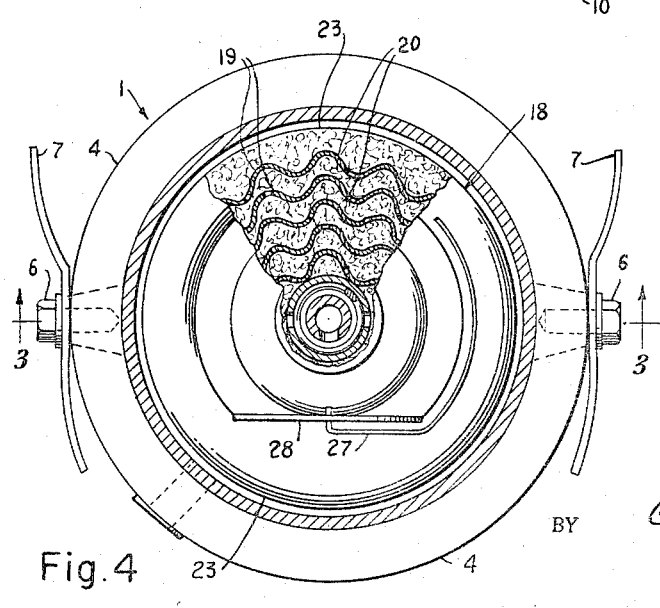
Figure 4 is a sectional plan view, partly broken away, taken on lines 4—4 of Figure 3.

Referring to the drawing, the oil filter of the invention includes a cylindrical casing 1, which is normally disposed vertically and is closed at its lower end, as at 2, and has a removable cover 3. The casing 1 has a plurality of vertically spaced fins 4 formed integrally therewith, and extending radially outwardly therefrom, for radiation and dissipation of heat.

Two pairs of bosses 5, each having a threaded opening formed therein for engagement by a bolt 6, are formed on opposite sides of the casing 1 for use in attaching thereto a pair of metal plates 7, which are provided for use in deflecting engine heat away from the casing 1, directing the air flow of the cooling fan into contact with and about the fins 4 to dissipate the heat therefrom and aid in cooling the lubricant circulated therethrough, and as a support for the filter.

A threaded fluid inlet 8 is provided in one side of the casing 1, and a drain opening 9, which is threaded for engagement by a plug 10, is provided in the lower end 2 thereof.

A tubular member 11, which is threaded internally at its ends and has one or more fluid openings 12 formed therein, is disposed vertically in the center of the casing 1. The upper end of the tubular member 11 is positioned at substantially the same elevation as the upper end of the casing 1. The lower end of the tubular member 11 extends downwardly through an opening provided therefor in the lower end 2 of the casing 1, and is rigidly connected thereto, to form a fluid outlet.

The cover 3 is dome shaped, and has a flat marginal portion 13 and a flanged peripheral edge 14 for engagement with the upper end of the casing 1. A bolt 15 is inserted in an opening provided therefor in the cover 3, and is received in the threaded upper end of the tubular member 11 whereby the upper end of the tubular member 11 is secured in place. An annular gasket 16 is positioned between the upper end of the casing 1 and the flat marginal portion 13 of the cover 3. A gasket 17 is positioned between the cover 3 and the head of the bolt 15.

A filter element or cartridge, which is expendable and is interchangeable with replacement units of the same type, is designated generally by the numeral 18. The filter element 18 includes an elongated sheet of corrugated material 19, which has characteristic porosity, such as cardboard, and an elongated sheet of absorbent fibrous material 20, such as cotton or paper batting, or other types of cellulose materials, which are wound together about a tubular core 21, which advantageously may be formed of cardboard, to form alternate, radially spaced layers of corrugated material 19 and absorbent fibrous material 20.

A plurality of fluid openings 22 may be formed in the corrugated material 19, if desirable to increase porosity and in the tubular core 21, the openings 22 of adjacent layers of the corrugated material 19 preferably being staggered with respect to each other. The perforations or openings 22 are essential in the tubular core 21 to insure proper circulation of the lubricant therethrough.

The wound material 19 and 20 is wrapped bodily in a sheet of absorbent fibrous material 23, similar to the material 20, and a pair of metal discs 24 are applied to the ends thereof. The discs 24 are secured in place by a pair of wood plugs 25, which are inserted in opposite ends of the tubular core 21, and retained therein by friction fit. The discs 24 have central openings therein for engagement of the plugs 25. A coil spring 26, which advantageously may be formed of baling wire or the like, is inserted in the tubular core 21 between the plugs 25, whereby the tubular core 21 is reenforced and the plugs 25 are effectively spaced apart.

A wire bail 27 is secured at its ends to a pair of ears 28 which are formed integrally with the uppermost disc 24, on opposite sides thereof.

A collar 29 surrounds the tubular member 11 and is adjustably connected thereto by a set screw 30. The filter element 18 is received bodily in the casing 1, and surrounds the tubular member 11. The plugs 25 have central openings therein for engagement by the tubular member 11. The filter element 18 is supported upon the collar 29, and a compression spring 31 is positioned between the upper end of the filter element 18 and the cover 3. Washers 32 are positioned between the respective plugs 25 and the collar 29 and the spring 31.

The invention may be modified in various ways without departing from the spirit and scope thereof.

What is claimed is:

1. In an oil filter for an internal combustion engine, the combination of a vertically disposed cylindrical casing, closed at its lower end and having a removable cover, a side inlet in the casing, a vertically disposed tubular member positioned in the center of the casing, the tubular member being threaded internally at its upper end and having one or more side openings therein, the lower end of the tubular member extending downwardly through the lower end of the casing to form a fluid outlet, a bolt extending through the cover for engagement with the threaded upper end of the tubular member whereby the upper end of the tubular member is secured in place, a filter element surrounding the tubular member and supported relative thereto by supporting means adjustably positioned relative to the tubular member, and resilient means acting upon the upper end of the filter element and the cover whereby the filter element is firmly seated on the supporting means, the filter element consisting of a rolled body comprising juxtaposed lengths of corrugated cardboard and paper batting wound together about a tubular cardboard core to form alternate, radially spaced layers of corrugated cardboard and paper batting, the corrugated cardboard and the tubular cardboard core each having a plurality of fluid openings therein, the wound material being wrapped in paper batting and having a pair of metal discs applied to the ends thereof, the discs having central openings therein, a pair of externally tapered annular wood plugs inserted through the openings of the respective discs and fractionally engaging the interior surface of the tubular core, the plugs having flanged outer ends for engagement with the discs whereby the discs are secured in place, and a coil spring received in the tubular core and yieldably engaging the inner ends of the plugs.

2. A filter element consisting of a rolled body comprising juxtaposed lengths of corrugated cardboard and paper batting wound together about a tubular cardboard core to form alternate, radially spaced layers of corrugated cardboard and paper batting, the corrugated cardboard and the tubular cardboard core each having a plurality of fluid openings therein, the wound material being wrapped in paper batting and having a pair of metal discs applied to the ends thereof, the discs having central openings therein, a pair of externally tapered annular wood plugs inserted through the openings of the respective discs and frictionally engaging the interior surface of the tubular core, the plugs having flanged outer ends for engagement with the discs whereby the discs are secured in place, and a coil spring received in the tubular core and yieldably engaging the inner ends of the plugs.

References Cited in the file of this patent

UNITED STATES PATENTS

| | | |
|---|---|---|
| 2,196,821 | Arnold | Apr. 9, 1940 |
| 2,209,180 | Von Pentz | July 23, 1940 |
| 2,375,345 | Burhans | May 8, 1945 |
| 2,599,604 | Bauer et al. | June 10, 1952 |
| 2,647,637 | Leet | Aug. 4, 1953 |
| 2,692,683 | Mason | Oct. 26, 1954 |
| 2,742,160 | Fogwell | Apr. 17, 1956 |
| 2,834,469 | Mitterer | May 13, 1958 |

FOREIGN PATENTS

| | | |
|---|---|---|
| 292,067 | Switzerland | July 31, 1953 |
| 304,377 | Switzerland | Jan. 15, 1955 |